United States Patent [19]
Wilk

[11] Patent Number: 6,002,644
[45] Date of Patent: Dec. 14, 1999

[54] IMAGING SYSTEM AND ASSOCIATED METHOD FOR SURVEYING UNDERWATER OBJECTS

[76] Inventor: Peter J. Wilk, 185 W. End Ave., New York, N.Y. 10023

[21] Appl. No.: 09/063,019

[22] Filed: Apr. 20, 1998

[51] Int. Cl.$^6$ ...................................................... G01S 15/88
[52] U.S. Cl. ............................ 367/88; 367/106; 367/131; 367/87
[58] Field of Search ................................ 367/87, 88, 106, 367/107, 131

[56] References Cited

U.S. PATENT DOCUMENTS

| | | |
|---|---|---|
| 4,197,591 | 4/1980 | Hageman . |
| 4,403,311 | 9/1983 | Tournois . |
| 5,025,423 | 6/1991 | Earp ............................................ 367/87 |
| 5,184,330 | 2/1993 | Adams et al. . |
| 5,200,931 | 4/1993 | Kosalos et al. ............................ 367/88 |
| 5,438,552 | 8/1995 | Audi et al. ................................. 367/88 |

FOREIGN PATENT DOCUMENTS 2085591  4/1982  United Kingdom .

*Primary Examiner*—Ian J. Lobo
*Attorney, Agent, or Firm*—R. Neil Sudol; Henry D. Coleman

[57] ABSTRACT

A system for surveying an underwater topography includes an ultrasonic sensor array disposable in physical contact with a body of water for generating electrical signals encoding ultrasonic echo responses of underwater objects in the body of water. The sensor array includes a plurality of electromechanical transducers in turn including at least one electroacoustic transducer and one acoustoelectric transducer. The transducers are disposed in a configuration extending in at least two dimensions. An a-c current generator is operatively connected to the electroacoustic transducer for energizing the electroacoustic transducer with an electrical signal of a pre-established ultrasonic frequency. Means are provided which operatively connected to the sensor array for determining locations of the electromechanical transducers relative to one another. A processor or computer is operatively connected to the sensor array for analyzing the electrical signals in accordance with the determined locations of the electromechanical transducers to determine surfaces of objects disposed at least partially in the body of water and for generating a video signal encoding an image of the objects. A video monitor is operatively connected to the processing means for displaying the image of the objects.

26 Claims, 5 Drawing Sheets

6,002,644

IMAGING SYSTEM AND ASSOCIATED METHOD FOR SURVEYING UNDERWATER OBJECTS

BACKGROUND OF THE INVENTION

This invention relates to an imaging system utilizing ultrasonic waves for sensing purposes. More particularly, this invention relates to such a system for use in surveying an underwater topography. This invention also relates to an associated method.

Treasure hunters' first and sometimes primary chore is determining the locations of valuable artifacts. A considerable number of archeological artifacts originating, for example, from ancient shipwrecks, remain underwater. Formerly, efforts to locate such marine treasure entailed diving with scuba gear or high pressure suits. More recently, submersibles and robotic cameras have been employed to scout for sunken ships.

Despite these modern solutions, the hunt for underwater artifacts remains impeded by the difficulty of detecting objects underwater when available light levels are low. Such low light levels exist at great depths and in shallower waters where silt and other waterborne particles scatter light. Of course, visual detection is completely impeded where artifacts have been covered by sand or silt. Although ferrous artifacts can be located in such conditions with the aid of magnetic detectors, non-ferrous artifacts such as bronzes, pottery, gold and silver remain undetectable.

OBJECTS OF THE INVENTION

An object of the present invention is to provide an imaging system which facilitates detection of underwater objects.

Another object of the present invention is to provide such an imaging system which is unaffected by existing light levels.

It is a more specific object of the present invention to provide such an imaging system capable of detecting objects inside other objects which are underwater.

A further object of the present invention is to provide an associated imaging method enabling the visual inspection of underwater objects even at low ambient light levels.

These and other objects of the present invention will be apparent from the drawings and descriptions herein.

SUMMARY OF THE INVENTION

A system for surveying an underwater topography comprises, in accordance with the present invention, an ultrasonic sensor network disposable in physical contact with a body of water for generating electrical signals encoding ultrasonic echo responses of underwater objects in the body of water. The sensor network includes a plurality of electromechanical transducers in turn including at least one electroacoustic transducer and one acoustoelectric transducer. The electromechanical transducers are disposed in an array which has at least two dimensions. An a-c current generator is operatively connected to the electroacoustic transducer for energizing the electroacoustic transducer with an electrical signal of a pre-established ultrasonic frequency. A position determination element is operatively connected to the sensor network for determining locations of the electromechanical transducers relative to one another. A processor is operatively connected to the sensor network for analyzing the electrical signals in accordance with the determined locations of the electromechanical transducers to determine surfaces of objects disposed at least partially in the body of water. The processor includes pattern recognition circuitry for comparing the determined object surfaces with a stored electronic library of stored surface data to identify the determined object surfaces as being consistent with a predetermined class of objects.

The system further comprises, in accordance with another aspect of the present invention, a position determination circuit operatively connected to the processor for determining locations of the determined object surfaces relative to a global frame of reference. A recording component is operatively connected to the processor and the position determination circuit for recording locations of the determined object surfaces relative to the global frame of reference. Thus, the latitude and longitude, as well as the depth, of a detected object of interest may be recorded for future reference. The recording component may include an electronic data store or, alternatively, a printer.

Where the underwater sensor network includes a carrier, with the transducers being mounted to the carrier, the detection system further comprises one or more motors operatively connected to the carrier for moving the carrier through the body of water. The motors may be mounted directly to the carrier, in a self-propelled implementation, or to motor modules, or to a surface or submarine vessel which then drags the sensor network carrier through the body of water. The motor modules are provided with wireless signal receivers for receiving instructions from a surface or underwater vessel.

The pattern recognition circuitry is operatively connected to the motor or motors for arresting the motors upon detecting that one of the determined object surfaces falls into a predetermined class of objects of interest. Thus, if something of particular interest is detected, other investigations may be undertaken immediately to confirm the identity and the importance of the find.

The processor may be located on the carrier itself or on a vessel which is pulling the carrier through the body of water. Alternatively, the processor may be disposed at a more remote location, on land, at sea or in the air. In that case, the sensor network may be linked to the processor (and the processor to the motors) via a wireless communications link.

The processor advantageously includes a video signal circuit generating a video signal encoding an image of the determined object surfaces. A video monitor is then operatively connected to the processor for displaying the image of the determined object surfaces.

In accordance with further features of the present invention, the processor includes a view selector operatively connected to the video monitor for selecting the image from among a multiplicity of possible images of the objects (different view angles or different magnifications, for example) and additionally includes a filter stage operatively connected to the video monitor for eliminating a selected object from the image. The eliminated object may be overlie a selected object of special interest. Fish and undersea vegetation may be filtered out from a displayed image to view objects on the floor of the body of water. Alternatively, floor of the body of water may be filtered out if fish, bottom dwellers, plant life and/or other denizens of the deep are the objects of interest.

The processor includes an analyzer operatively connected to the acoustoelectric transducer(s) for determining three-dimensional shapes of the objects by analyzing signals generated by the acoustoelectric transducer(s) in response to ultrasonic pressure waves produced at the objects in response to ultrasonic pressure waves produced by the electromechanical transducer(s). The various components of the processor, including the analyzer, are realized in a general purpose computer by generic processing circuits configured by programmed instructions.

Where the electromechanical transducers include a plurality of electroacoustic transducers disposed in a predetermined array, the underwater detection system further comprises means for energizing the electroacoustic transducers in a predetermined sequence. Thus, the processor is able to associate any set of incoming reflected pressure waves with the particular transducer which generated the pressure waves. The different transducer locations as well as multiple scanning operations provide enhanced information for data processing purposes. This enables not only the refinement of the image (increased resolution) but also enables the selection (by the operator, usually) of different view angles.

Where the electromechanical transducers include a plurality of acoustoelectric transducers disposed in a predetermined array, the underwater detection system further comprises means for receiving signals from the acoustoelectric transducers in a predetermined sequence. Because of this structure, the processor processes multiple sets of incoming reflected pressure waves each associated with the particular sensor which detects the pressure waves. Again, the different sensor locations as well as multiple scanning operations provide enhanced information which enables image refinement and the selection of different view angles. Of course, information utilized in image processing is maximized where the sensor array includes multiple distributed pressure wave generators and multiple distributed pressure wave receivers.

The determination of transducer position may be implemented simply in the case of a substantially rigid carrier. The electromechanical transducers are mounted to the carrier so that the locations of the electromechanical transducers relative to one another are fixed by the carrier. However, it is alternatively possible for the transducers to be disposed at variable locations relative to one another. In that case, the instantaneous positions of the pressure wave generators and the pressure wave receivers relative to each other are determined by processing or analyzing additional electrical signals generated by the sensors or receivers in response to pressure waves transmitted through the body of water directly from the electroacoustic transducers or generators to the acoustoelectric sensors or receivers.

A method for surveying an underwater topography comprises, in accordance with the present invention, steps of disposing an array of electroacoustic transducers in operative contact with a body of water, determining physical locations of the transducers relative to each other, and energizing the transducers to generate a series of electrical signals encoding echo responses of underwater objects in the body of water, the echo responses corresponding to a multiplicity of pressure wave paths from the transducers to each of the objects and back to the transducers. The method further comprises a step of automatically analyzing the electrical signals to determine surfaces of objects disposed at least partially in the body of water. This analyzing includes the step of comparing the determined object surfaces with a stored electronic library of stored surface data to identify the determined object surfaces as being consistent with a predetermined class of objects.

In accordance with another feature of the present invention, further comprises the steps of determining locations of the determined object surfaces relative to a global frame of reference, and automatically recording locations of the determined object surfaces relative to the global frame of reference.

Where the transducers are mounted to a carrier, the method also comprises the step of operating a motor to move the carrier through the body of water. The motor is automatically stopped upon detecting that one of the determined object surfaces falls into a predetermined class of objects of interest.

In accordance with a preferred mode of operation, the method further comprises the step of generating a video signal encoding an image of the determined object surfaces, and displaying the image of the determined object surfaces. A selected object may be automatically eliminated from the displayed image, for purposes of facilitating the viewing of other objects I the image.

Where the electromechanical transducers include a plurality of acoustoelectric sensors, the energizing of the transducers may include receiving signals from the sensors in a predetermined sequence.

Where the image is selected from among a multiplicity of possible images of the objects, the method further comprises subsequently selecting a different image from among the possible images and displaying the different image on the monitor.

An ultrasonic imaging system in accordance with the present invention facilitates detection of underwater objects, even when the ambient light levels are insufficient to allow visual inspection.

DESCRIPTION OF THE PREFERRED EMBODIMENTS

Figure 1:
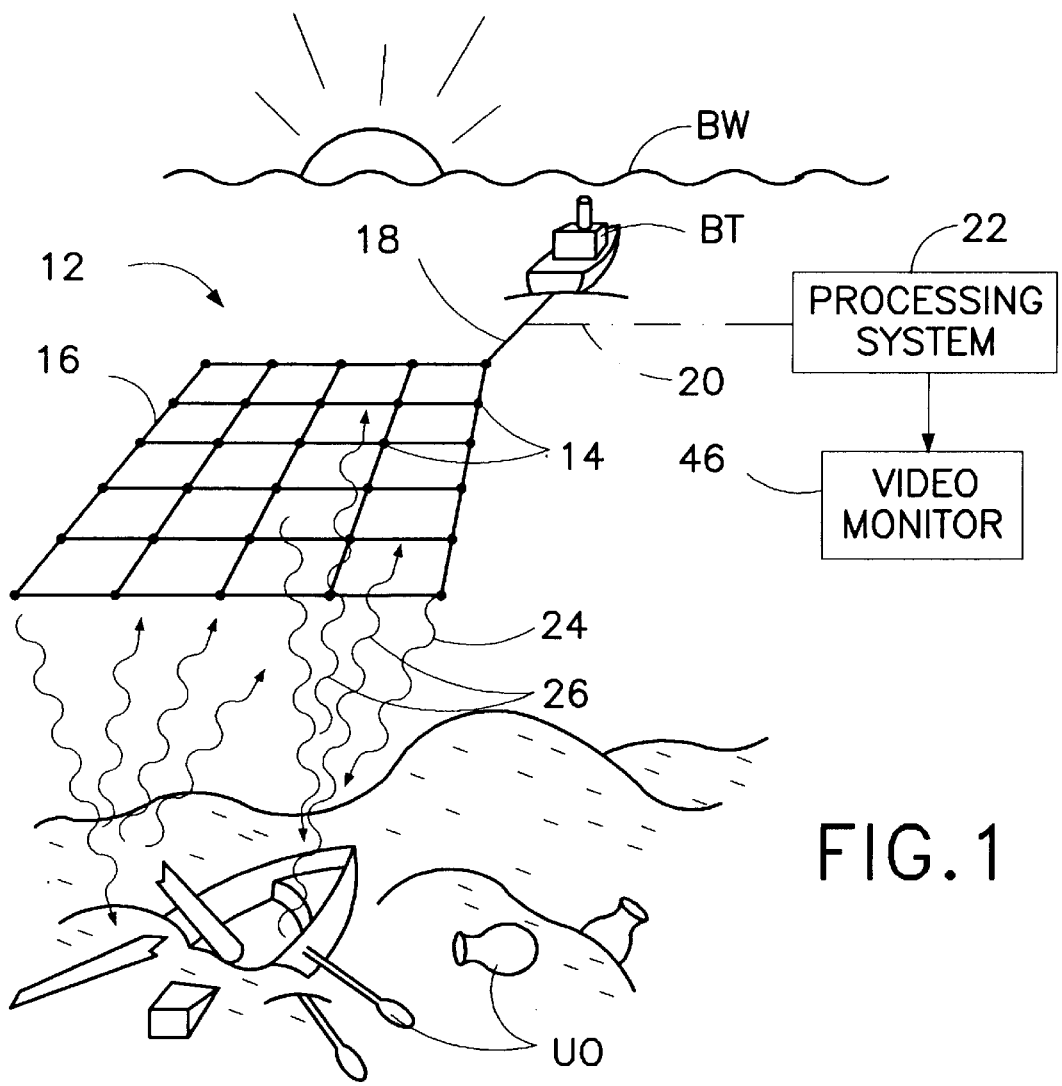
FIG. 1 is a partially a schematic perspective view and partially a block diagram of a nautical ultrasonic imaging system in accordance with the present invention.

As illustrated in FIG. 1, a system for surveying an underwater topography comprises an ultrasonic sensor array 12 disposable in physical contact with a body of water BW. The sensor array generates electrical signals encoding ultrasonic echo responses of underwater objects UO in the body of water BW. Sensor array 12 includes a plurality of electromechanical transducers 14 exemplarily realized essentially by piezoelectric wafers. Sensor array 12 further includes a carrier 16 such as a net. Carrier net 16 is towed through water body BW by a boat BT via a tow line 18. A multiple lead cable or wireless telecommunications link 20 extends along tow line 18 and operatively connects transducers 14 to a processing system 22. Processing system 22 analyzes incoming electrical ultrasonic signals arriving from transducers 14 and generates a video signal encoding an image of an underwater topography including one or more of the underwater objects UO. The video signal is fed to a monitor 46 for display of the image thereon.

Sensor array 12 and more particularly selected transducers 14 produce mechanical pressure waves 24 of one or more ultrasonic frequencies. These outgoing pressure waves 24 are reflected from the underwater objects UO, as indicated at 26, and received by transducers 14. The incoming pressure waves are converted by selected transducers of sensor array 12 into electrical signals transmitted over cable or wireless telecommunications link 20 to processing system 22.

In order to optimize data production, transducers are disposed in a configuration extending in at least two dimensions. This configuration is determined in part by the attachment of transducers 14 to carrier net 16.

Figure 2:
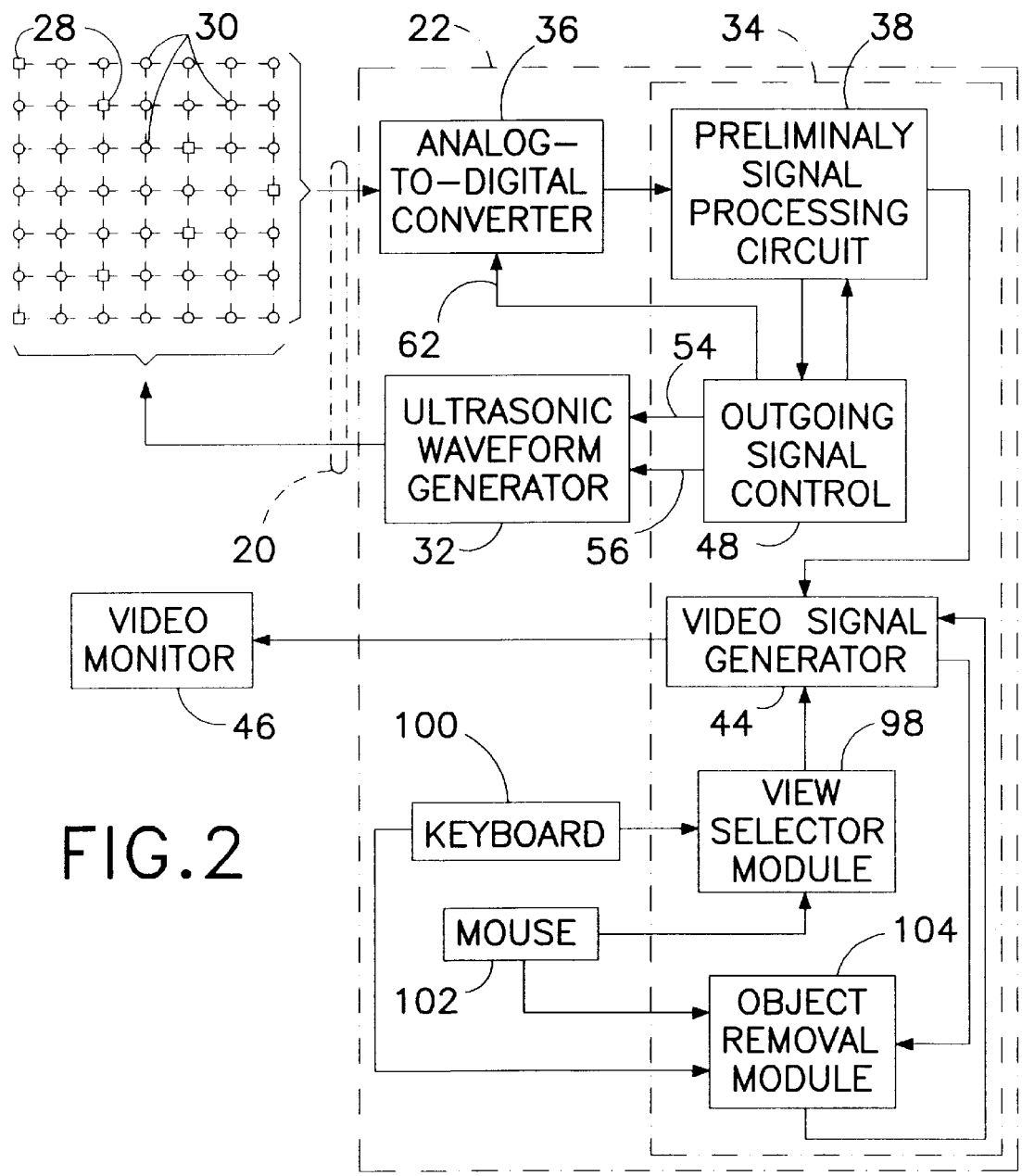
FIG. 2 is a block diagram showing components of a processing system depicted in FIG. 1.

As illustrated in FIG. 2, transducers 14 include a plurality of pressure-wave-generating electroacoustic transducers 28 and a plurality of pressure-wave-receiving acoustoelectric transducers or sensors 30. Transducers or wave generators 28 are arranged in a predetermined two- or three-dimensional configuration such as a V. Transducers or sensors 30 also have a two- or three-dimensional configuration.

An a-c current or waveform generator 32 is operatively connected to electroacoustic transducers 28 for energizing the electroacoustic transducers 28 with an electrical signal of a pre-established ultrasonic frequency. Electroacoustic transducers or wave generators 28 are energized one at a time, in a predetermined sequence, by the same ultrasonic frequency or by different ultrasonic frequencies.

Acoustoelectric transducers or sensors 30 are operatively connected via cable or wireless telecommunications link 20 and an analog-to-digital converter 36 to a digital processor 34. Processor 34 may be implemented by a general purpose computer specially programmed to realize the functional modules shown in FIG. 2. Processor 34 includes, as one such module, a preliminary signal processing circuit 38 which analyzes incoming pressure waves 26 in accordance with the location of the particular electroacoustic transducer 28 which generated the outgoing pressure wave 24 reflected by the underwater objects UP to produce the incoming pressure waves 26.

Figure 3:
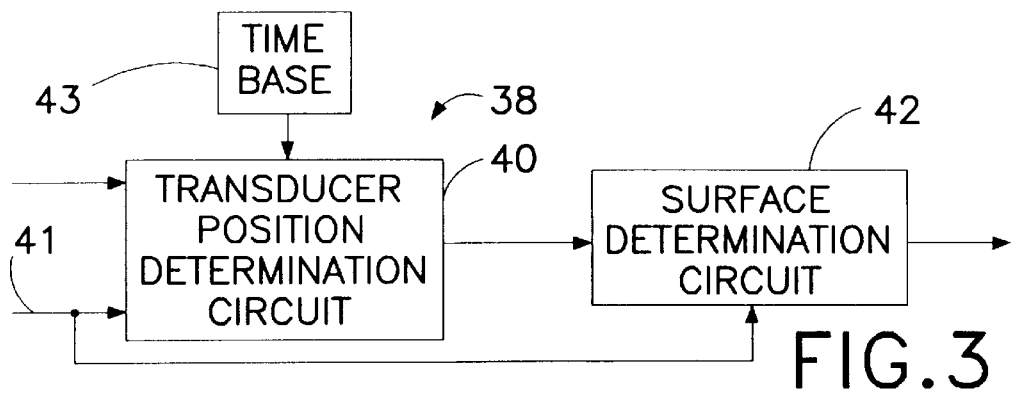
FIG. 3 is a block diagram of a preliminary signal processing circuit illustrated in FIG. 2.

As illustrated in FIG. 3, preliminary signal processing circuit 38 includes a circuit 40 for determining the positions of transducers 14 relative to one another. Circuit 40 receives, via a lead or multiple 41 extending from analog-to-digital converter 36, electrical signals derived from the incoming pressure waves 26. Circuit 40 separates out those signals corresponding to direct or unreflected ultrasonic pressure wave transmission paths to determine the relative locations of transducers 14. The encoded locations of transducers 14 are communicated by circuit 40 to a surfaces detection circuit 42. Circuit 42 analyzes incoming electrical signals from sensor array 12 to determine and analytically define the surfaces of underwater objects UO which generate reflected pressure waves 26 in response to ultrasonic pressure waves 24 (FIG. 1). Circuit 42 determines the three-dimensional shapes of the underwater objects UO. A time base 43 enables operation of circuits 40 and 42.

As shown in FIG. 2, preliminary signal processing circuit 38 is operatively connected to a video signal generator 44. Partially in response to surface data from circuit 38, generator 44 produces a video signal encoding an image of an underwater topography including selected underwater objects UO. Generator 44 is connected to video monitor 46 for displaying the underwater image.

Figure 4:
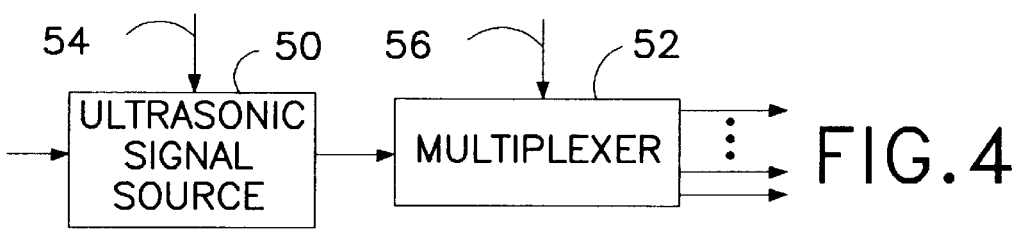
FIG. 4 is a block diagram of an ultrasonic waveform generator shown in FIG. 2.

Preliminary signal processing circuit 38 is operatively connected to waveform generator 32 via an outgoing signal control unit 48. Control unit 48 produces a control signal which determines, for example, the frequency of an outgoing ultrasonic pressure wave 24 and the identity of the electroacoustic transducer 28 generating that pressure wave. Waveform generator 32 comprises a variable-frequency ultrasonic signal source 50 and a multiplexer 52, as illustrated in FIG. 4. Source 50 and multiplexer 52 receive control signals via respective leads 54 and 56 from control unit 48. Multiplexer 52 operates to connect signal source 50 sequentially to different electroacoustic transducers 28. Typically, the energization sequence of transducers 28 is pre-established and determined in part by the specific configurations of transducers 28 and transducers 30 on carrier 16. In many cases, in order to facilitate the separation of incoming reflected signals 26 originating at different electroacoustic transducers 28, these transducers are activated with signals of detectably different ultrasonic frequencies. The sequence of transducer activation and the frequency or frequencies of actuation are communicated by control unit 48 to surfaces detection circuit 42. Detection circuit 42 utilizes that information to properly analyze the arriving ultrasonic signals. In the event that the incoming data is insufficient for detection circuit 42 to isolate, calculate and define surfaces of underwater objects UO, the detection circuit may transmit a signal to control unit 48 to change the energization sequence of transducers 28 and/or the energization frequencies.

Figure 5:
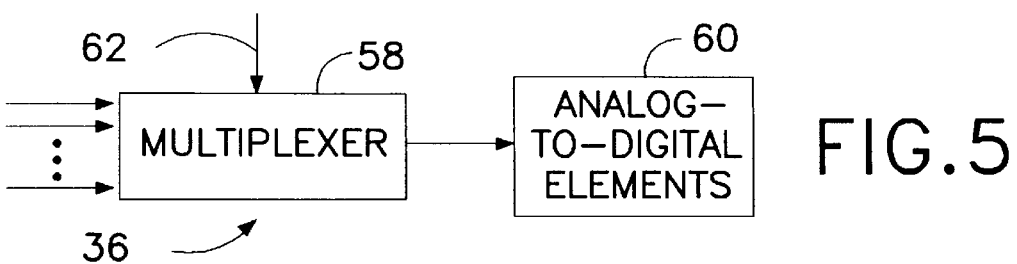
FIG. 5 is a block diagram of a digital-to-analog converter shown in FIG. 2.

As illustrated in FIG. 5, analog-to-digital converter 36 includes a multiplexer 58 and digitization elements 60. Multiplexer 58 receives a switching control signal via a lead 62 extending from control unit 48. Control unit 48 enables the decoding of incoming ultrasonic pressure waves in a pre-established sequence. This sequence is determined in part by the configurations of transducers 28 and 30 and by the frequencies of energization. In addition, surfaces detection circuit 42 (FIG. 3) may cause control unit 48 to vary the signal reception sequence for purposes of enhancing resolution and surface detection.

Figure 6:
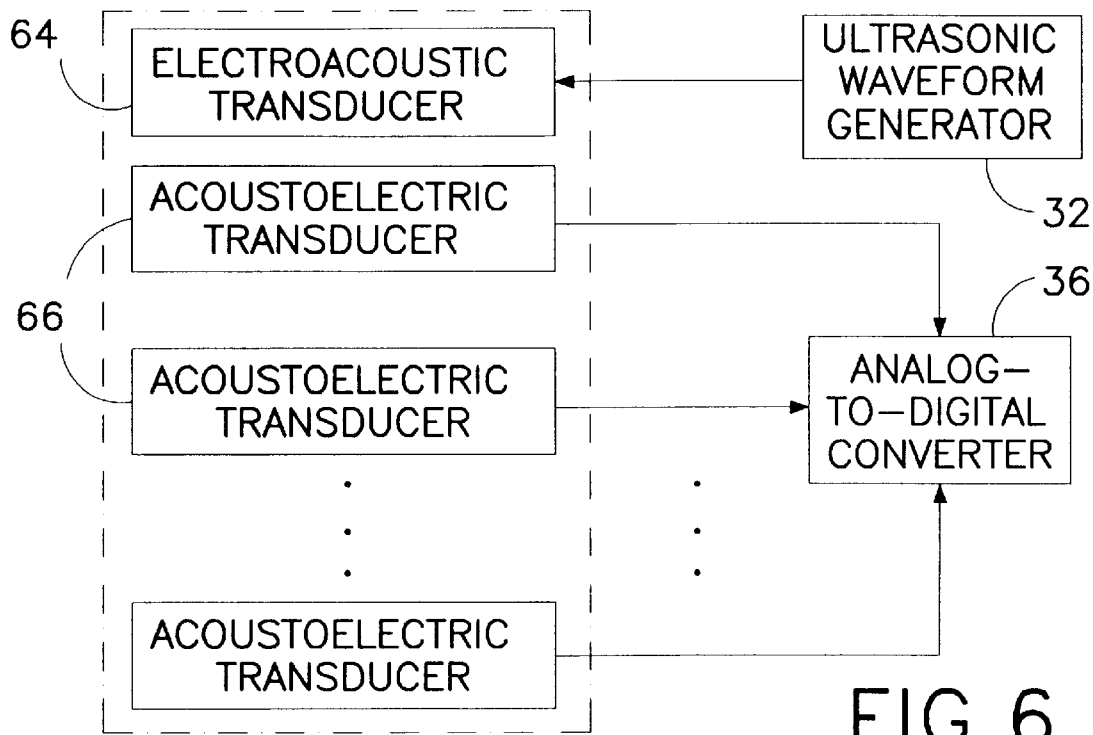
FIG. 6 is a block diagram showing a specific variant of the system of FIGS. 1 and 2.

FIG. 6 shows a specific configuration of an underwater-topography imaging system including just one electroacoustic transducer 64 and a multiplicity of acoustoelectric transducers 66. Here the enhancement of image resolution and optimization of surface detection and definition are accomplished mainly by varying the ultrasonic output frequency of the one electroacoustic transducer and the sequence of signal transmission from sensors or acoustoelectric transducers 30.

Figure 7:
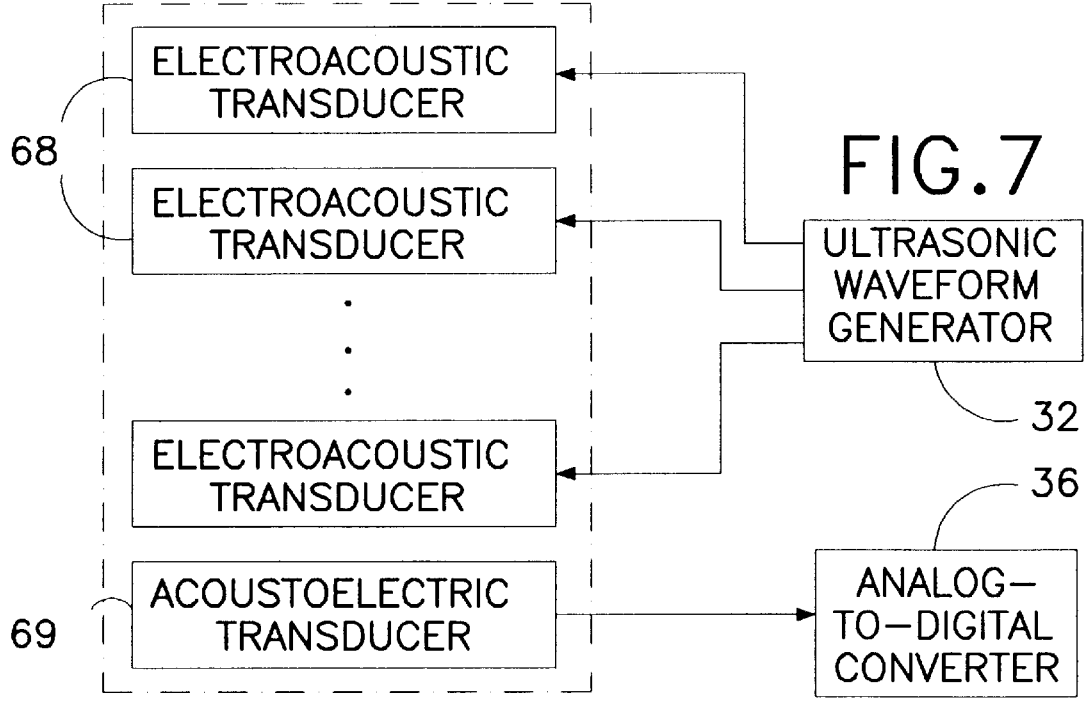
FIG. 7 is a block diagram showing another variant of the system of FIGS. 1 and 2.

FIG. 7 depicts a particular configuration of another underwater-topography imaging system including just multiple electroacoustic transducers 68 and a single acoustoelectric transducer 69. In this case, the enhancement of image resolution and optimization of surface detection and definition are accomplished by varying the ultrasonic output frequencies and the energization sequence of the electroacoustic transducers.

Figure 8:
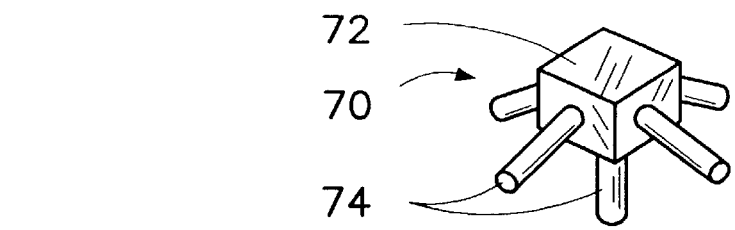
FIG. 8 is a schematic perspective view of an ultrasonic pressure wave generating and/or sensing unit utilizable in an ultrasonic imaging system in accordance with the present invention.

As shown in FIG. 8, an ultrasonic pressure wave generating and/or sensing unit 70 attachable, for instance, to a junction of different strands of carrier net 16 comprises a body or casing 72 and a plurality of tubular directional elements 74 projecting in different directions from body 72. Each element 74 is associated with a respective piezoelectric wafer or chip (not illustrated). Thus, a single location on carrier net 16 may support a plurality of electroacoustic transducers 28 and/or acoustoelectric transducers 30. However, there must be a plurality of locations on carrier net 16 which carry one or more ultrasonic pressure wave transducers 14.

Figure 9:
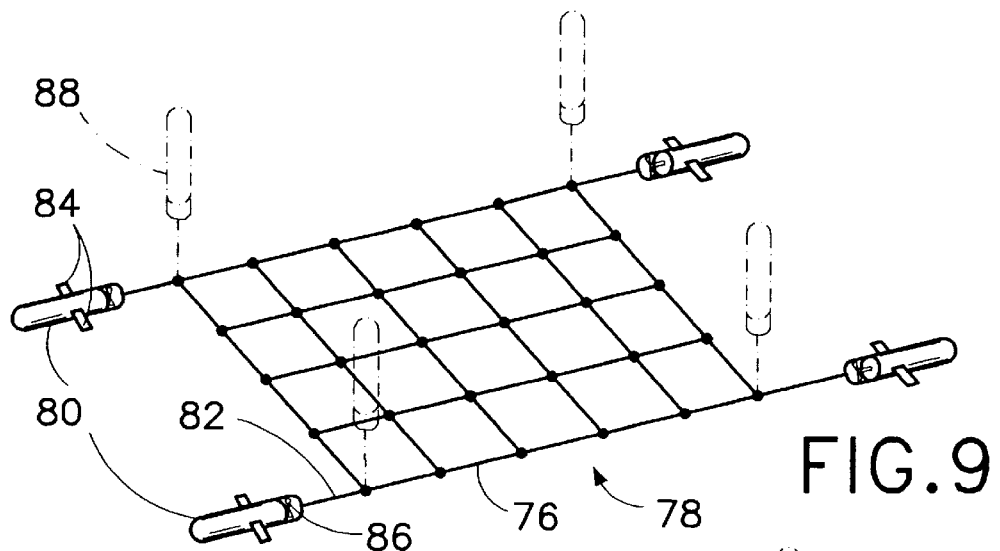
FIG. 9 is a schematic perspective view of a carrier net and dedicated propeller units of a modified ultrasonic imaging system in accordance with the present invention.

As depicted in FIG. 9, a carrier net 76 for an ultrasonic sensor array 78 may be provided with a plurality of self-contained motive or propeller units 80. Units 80 are connected to net 76 via tension lines 82 and have steering vanes 84, as well as propellers 86. Steering vanes 84 and propellers 86 may be controlled from a remote location, for example, a ship (not shown) either via a signal transmission cable (not shown) or via wireless signal transmitters and receivers (not shown).

Propeller units 80 are attached to carrier net 76 for applying a force thereto relative to a body of water in which or one which carrier net 76 is disposed. It is contemplated that an underwater disposition of carrier net 76, for example, below any surface wave action, would be optimal for reducing stress on the carrier and for facilitating the maintenance of the sensor array 78 in a given configuration. The orientations of propeller units 80 relative to carrier net 76 will change, as indicated in phantom lines at 88, to lift carrier net 76 towards the surface of a body of water after completion of a maritime scanning operation. It is to be noted that propeller units 80 can be differentially operated to translate carrier net 76 and the entrained sensor array 78 in different directions, including up and down and parallel to an underlying underwater geologic surface. The orientation of carrier net 76 in a body of water may be changed to facilitate scanning and object detection operations.

Figure 10:
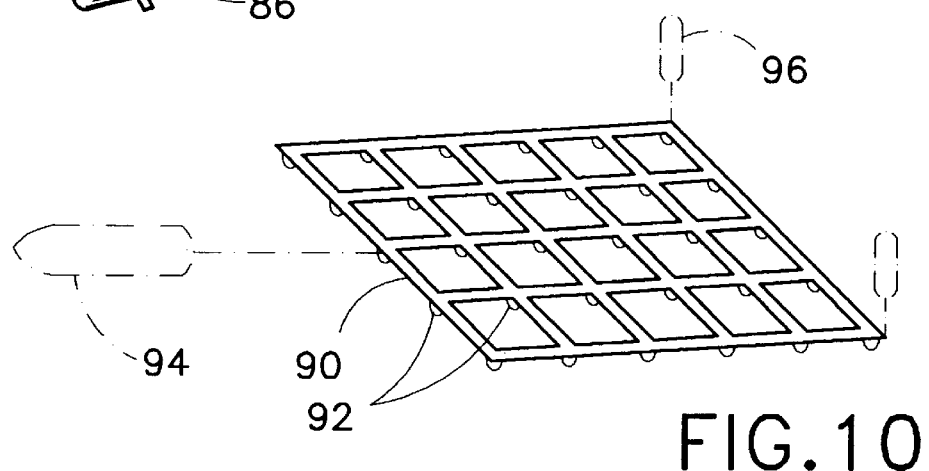
FIG. 10 is a schematic perspective view of a rigid carrier and dedicated propeller units of another modified ultrasonic imaging system in accordance with the present invention.

FIG. 10 depicts a carrier 90 of rigid frame construction. Fastened to carrier 90 are a plurality of ultrasonic pressure wave generating and/or sensing units 92. Carrier 90 may be dragged along a water surface or beneath the surface by a dedicated propeller unit 94. Auxiliary propeller units 96 may be tethered to carrier 90 for assisting the main propeller unit 94 in orienting the carrier and in raising and lowering the carrier through a body of water. As discussed above, ultrasonic pressure wave generating and/or sensing units 92 are operatively connected to a processing system 22 (FIG. 1) via a cable or wireless transceiver components. In the embodiment of FIG. 10, the determination of transducer position may be implemented simply and automatically by virtue of fixation of the locations of the electromechanical transducers 92 relative to one another.

Figure 11:
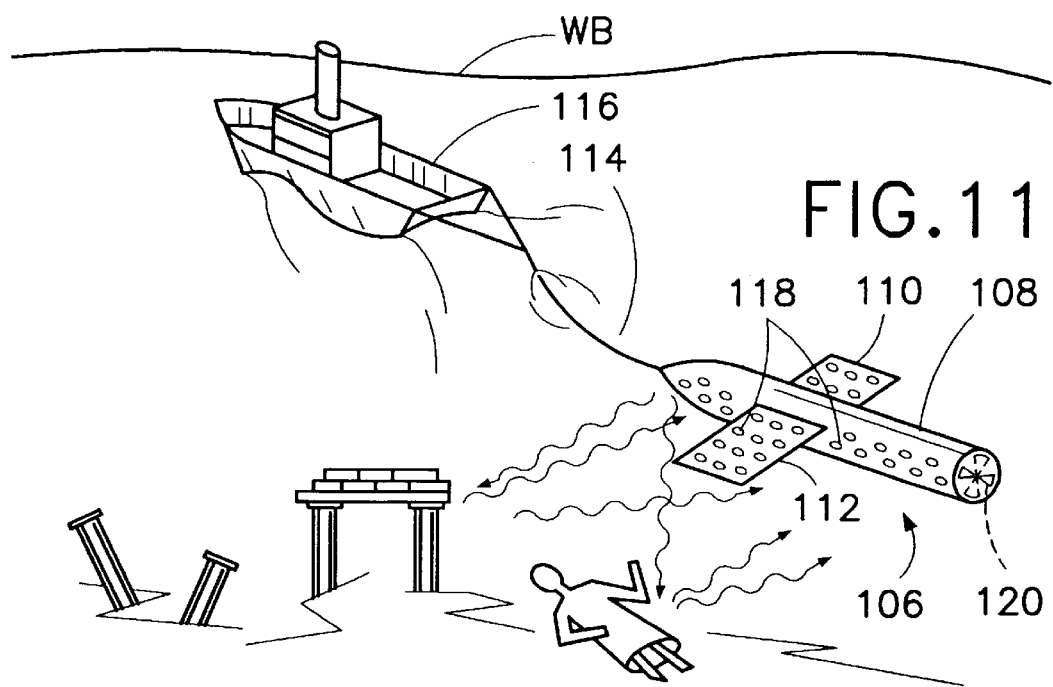
FIG. 11 is a schematic perspective view of another rigid carrier of transducers of an ultrasonic imaging system in accordance with the present invention.

FIG. 11 illustrates another transducer carrier 106 of substantially rigid construction. Carrier 106 includes a substantially cylindrical body 108 with a pair of stabilizers 110 and 112. Stabilizers 110 and 112 may be shiftable relative to body 108, by respective motors (not illustrated), for facilitating the steering of carrier 106 through a body of water WB. Carrier 106 is dragged through the water by a tension line 114 connected to a back end of a surface vessel 116.

An array of electromechanical (electroacoustic and acoustoelectric) transducers 118 are mounted to carrier body 116 and optionally stabilizers 110 and 112 for picking up reflected pressure waves of ultrasonic frequencies from underwater surfaces. A signal transmission line (not separately illustrated) extending along tension line 114 or a wireless transmission link may be provided for carrying signals between transducers 118 and vessel 116. If carrier 106 is provided with motors for shifting stabilizers 110 and 112, control signals for those motors may also be carried by this transmission line.

Carrier body 108 may be enclosed and define one or more internal chambers. For example, carrier body 108 may itself be a personnel-carrying submarine. In that event, a propeller 120 is located at the rear end of the carrier body 108.

As illustrated in FIG. 2, processor 34 includes a view selector module 98 which is operatively connected to video monitor 46 for selecting a displayed image from among a multiplicity of possible images of underwater objects UO. More specifically, view selector module 98 operates in response to instructions from a keyboard 100 or a mouse 102 to select a view angle and a magnification for the displayed image. Accordingly, a user may induce a change in the displayed image from one view angle to another or from one magnification to another.

As further illustrated in FIG. 2, processor 34 includes a filter stage or object removal module 104 operatively connected to video monitor 46 for eliminating a selected object or portion of an object from the displayed image. Modules 98 and 104 are incorporated into processor 34 and are realized by generic computer circuits whose functions are determined by programming.

In surveying an underwater topography utilizing an imaging system as described herein above, for instance, with reference to FIG. 1, the sensor array is disposed in operative contact with body of water BW, determining physical locations of the transducers relative to each other, and energizing the transducers to generate a series of electrical signals encoding echo responses of underwater objects in the body of water, the echo responses corresponding to a multiplicity of pressure wave paths from the transducers to each of the objects and back to the transducers. The electrical signals are automatically analyzed to generate a video signal encoding an image of the objects, the video signal being fed to a video monitor to thereby display the objects on the monitor.

Figure 12:
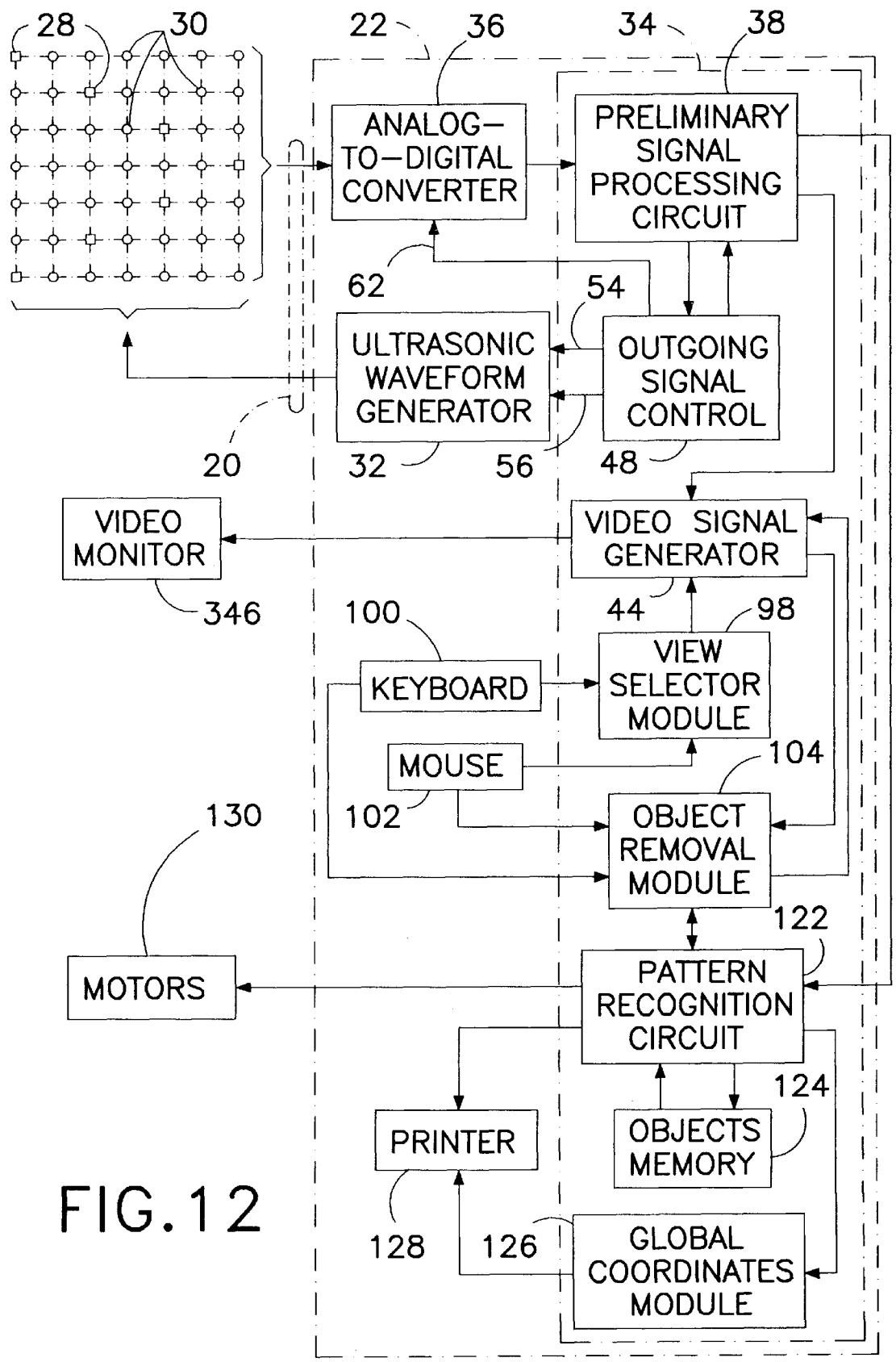
FIG. 12 is a block diagram similar to FIG. 2 and containing additional elements of a processor and of an ultrasonic imaging system in accordance with the present invention.

FIG. 12 illustrates all of the elements shown in FIG. 2 and shows additional components of processing system 22 and digital processor 34. In particular, a pattern recognition circuit or module 122 is operatively connected to preliminary signal processing circuit 38 for purposes automatically analyzing the surface data from circuit 38 to identify types of objects located underwater. Pattern recognition circuit 122 consults a memory 124 which is loaded with data describing the shapes of objects of various classes. The contents of memory 124 may vary, depending on the purposes of underwater searching. For example, where the imaging system is used for antiquities hunting, memory 124 contains encoded templates for ancient ships, columns, urns, statuary, and other objects known to be frequently transported via sea going vessels. Where the imaging system is used for applications in marine biology, memory 124 contains three-dimensional surface data describing the shapes of different underwater life forms, which may include fish, mammals, crustaceans, jellyfish, squid, etc. In any case, where images of underwater target objects are to be shown on video monitor 46, object removal module 104 filters out those objects which are not selected as being of interest. Object removal module 104 may also consult memory 124, either directly or indirectly via pattern recognition circuit 122, to determine which objects are to be displayed and which objects are to be deleted from representation on video monitor 46. Of course, input devices such as keyboard 100 may be operatively connected to pattern recognition circuit 122 for purposes of enabling user selection of object classes of interest during any particular ultrasonic underwater search.

Processor 34 further includes a module 126 for determining a location relative to global coordinates (latitude, longitude, and sea or ocean depth). This module receives input from conventional navigation equipment (not illustrated). Coordinates module 126 and pattern recognition circuit 122 are connected to a storage or recording device 128 such as a printer and/or to memory 124 for purposes of recording the identity and location of any objects detected by pattern recognition circuit 122. Thus, a sensor carrier 16, 76, 90, 106 may move along a search path while continually monitoring underwater objects and maintaining a log of detected objects. Subsequently, a manned or robotic vessel may be dispatched to more closely inspect any located objects of interest.

In an alternative search mode, pattern recognition circuit 122 is connected to motors 130 which propel the sensor carrier 16, 76, 90, 106. Upon detecting an object of possible interest, pattern recognition circuit 122 de-energizes motors 130, thereby maintaining the sensor carrier in proximity to the objects while a closer or more complete investigation is undertaken.

It is to be noted that an ultrasonic transducer carrier 16, 76, 90, 106 as described herein may be provided with various devices for protecting the sensor array from marine creatures such as dolphins or sharks. Such protective devices could include chemical dispensers for releasing repellants into the water. The ultrasonic pressure waves may in themselves have a repellant effect, as with land animals such as rodents.

Although the invention has been described in terms of particular embodiments and applications, one of ordinary skill in the art, in light of this teaching, can generate additional embodiments and modifications without departing from the spirit of or exceeding the scope of the claimed invention. For example, sensor carriers 16, 76, 90, 106 may take various forms and shapes and may be provided with various ancillary devices such as video cameras, manipulating arms, storage compartments for objects retrieved by such arms. Where the carrier is provided with dedicated motors, processor 34 may be provided with programs for filtering out ultrasonic vibrations arising from the operation of the motors. Accordingly, it is to be understood that the drawings and descriptions herein are preferred by way of example to facilitate comprehension of the invention and should not be construed to limit the scope thereof.

What is claimed is:

1. A system for surveying an underwater topography, comprising:

ultrasonic sensor means disposable in physical contact with a body of water for generating electrical signals encoding ultrasonic echo responses of underwater objects in said body of water, said sensor means including a plurality of electromechanical transducers in turn including at least one electroacoustic transducer and one acoustoelectric transducer, said electromechanical transducers being disposed in an array which has at least two dimensions;

an a-c current generator operatively connected to said electroacoustic transducer for energizing said electroacoustic transducer with an electrical signal of a preestablished ultrasonic frequency;

position determination means operatively connected to said sensor means for determining locations of said electromechanical transducers relative to one another; and processing means operatively connected to said sensor means for analyzing said electrical signals in accordance with the determined locations of said electromechanical transducers to determine surfaces of objects disposed at least partially in said body of water, said processing means including pattern recognition circuitry for comparing the determined object surfaces with a stored electronic library of stored surface data to identify the determined object surfaces as being consistent with a predetermined class of objects.

2. The system defined in claim 1, further comprising:

additional position determination means operatively connected to said processing means for determining locations of said determined object surfaces relative to a global frame of reference; and a recording component operatively connected to said processing means and said additional position determination means for recording locations of said determined object surfaces relative to said global frame of reference.

3. The system defined in claim 2 wherein said recording component includes an electronic data store.

4. The system defined in claim 2 wherein said recording component includes a printer.

5. The system defined in claim 1 wherein said underwater sensor means includes a carrier, said transducers being mounted to said carrier, further comprising motor means operatively connected to said carrier for moving said carrier through said body of water.

6. The system defined in claim 5 wherein said pattern recognition circuitry is operatively connected to said motor means for arresting said motor means upon detecting that one of said determined object surfaces falls into a predetermined class of objects of interest.

7. The system defined in claim 5 wherein said motor means is mounted to said carrier so that said carrier is self-propelled.

8. The system defined in claim 5 wherein said motor means is mounted to a vessel, said vessel being tied to said carrier.

9. The system defined in claim 1 wherein said processing means is operatively connected to said sensor means via a wireless communications link.

10. The system defined in claim 1 wherein said processing means includes a video signal circuit generating a video signal encoding an image of said determined object surfaces, further comprising a video monitor operatively connected to said processing means for displaying the image of said determined object surfaces.

11. The system defined in claim 10 wherein said processing means includes a view selector operatively connected to said video monitor for selecting said image from among a multiplicity of possible images of said objects.

12. The system defined in claim 10 wherein said processing means includes a filter stage operatively connected to said video monitor for eliminating a selected object from said image.

13. The system set forth in claim 1 wherein said processing means includes analyzing means operatively connected to said acoustoelectric transducer for determining three-dimensional shapes of said objects by analyzing signals generated by said acoustoelectric transducer in response to ultrasonic pressure waves produced at said objects in response to ultrasonic pressure waves produced by said electromechanical transducers.

14. The system defined in claim 1 wherein said electromechanical transducers include a plurality of electroacoustic transducers disposed in a predetermined array, further comprising means for energizing said electroacoustic transducers in a predetermined sequence.

15. The system defined in claim 1 wherein said electromechanical transducers include a plurality of acoustoelectric transducers disposed in a predetermined array, further comprising means for receiving signals from said acoustoelectric transducers in a predetermined sequence.

16. The system set forth in claim 1 wherein said position determination means includes a substantially rigid carrier, said electromechanical transducers being mounted to said carrier so that the locations of said electromechanical transducers relative to one another are fixed by said carrier.

17. A method for surveying an underwater topography, comprising:
disposing an array of electroacoustic transducers in operative contact with a body of water;
determining physical locations of said transducers relative to each other;
energizing said transducers to generate a series of electrical signals encoding echo responses of underwater objects in said body of water, said echo responses corresponding to a multiplicity of pressure wave paths from said transducers to each of said objects and back to said transducers;
automatically analyzing said electrical signals to determine surfaces of objects disposed at least partially in said body of water, said analyzing including comparing the determined object surfaces with a stored electronic library of stored surface data to identify the determined object surfaces as being consistent with a predetermined class of objects.

18. The method defined in claim 17, further comprising:
determining locations of said determined object surfaces relative to a global frame of reference; and
automatially recording locations of said determined object surfaces relative to said global frame of reference.

19. The method defined in claim 17 wherein said transducers are mounted to a carrier, further comprising operating a motor to move said carrier through said body of water.

20. The method defined in claim 19, further comprising automatically stopping said motor upon detecting that one of said determined object surfaces falls into a predetermined class of objects of interest.

21. The method defined in claim 17, further comprising generating a video signal encoding an image of said determined object surfaces, and displaying the image of said determined object surfaces.

22. The method defined in claim 21, further comprising automatically eliminating a selected object from said image.

23. The method defined in claim 17 wherein said electromechanical transducers include a plurality of acoustoelectric sensors, the energizing of said transducers including receiving signals from said sensors in a predetermined sequence.

24. The method defined in claim 17, further comprising selecting said image from among a multiplicity of possible images of said objects, further comprising subsequently selecting a different image from among said possible images and displaying said different image on said monitor.

25. A system for surveying an underwater topography, comprising:
sensor means disposable in physical contact with a body of water for generating electrical signals encoding echo responses of underwater objects in said body of water, said sensor means including a plurality of electromechanical transducers in turn including at least one electroacoustic transducer and one acoustoelectric transducer, said electromechanical transducers being disposed in an array which has at least two dimensions;
an a-c current generator operatively connected to said electroacoustic transducer for energizing said electroacoustic transducer with an electrical signal of a pre-established frequency;
position determination means operatively connected to said sensor means for determining locations of said electromechanical transducers relative to one another; and
processing means operatively connected to said sensor means for analyzing said electrical signals in accordance with the determined locations of said electromechanical transducers to determine surfaces of objects disposed at least partially in said body of water, said processing means including pattern recognition circuitry for comparing the determined object surfaces with a stored electronic library of stored surface data to identify the determined object surfaces as being consistent with a predetermined class of objects.

26. The system defined in claim 25, further comprising:
additional position determination means operatively connected to said processing means for determining locations of said determined object surfaces relative to a global frame of reference; and
a recording component operatively connected to said processing means and said additional position determination means for recording locations of said determined object surfaces relative to said global frame of reference.

* * * * *